(12) United States Patent
Sun et al.

(10) Patent No.: US 10,319,970 B2
(45) Date of Patent: Jun. 11, 2019

(54) LITHIUM-ION BATTERY AND ELECTRIC VEHICLE UTILIZING THE SAME

(71) Applicant: ZHEJIANG CHILWEE CHUANGYUAN INDUSTRY COMPANY LTD., Zhicheng (CN)

(72) Inventors: Yanxian Sun, Zhicheng (CN); Ning Ren, Zhicheng (CN); Aiming Li, Zhicheng (CN); Xiaoxu Yang, Zhicheng (CN); Haifei Zhang, Zhicheng (CN)

(73) Assignee: ZHEJIANG CHILWEE CHUANGYUAN INDUSTRY COMPANY LTD., Zhicheng (CN)

( * ) Notice: Subject to any disclaimer, the term of this patent is extended or adjusted under 35 U.S.C. 154(b) by 0 days.

(21) Appl. No.: 15/327,893

(22) PCT Filed: Jul. 24, 2015

(86) PCT No.: PCT/CN2015/085029
§ 371 (c)(1),
(2) Date: Jan. 20, 2017

(87) PCT Pub. No.: WO2016/015603
PCT Pub. Date: Feb. 4, 2016

(65) Prior Publication Data
US 2017/0214018 A1    Jul. 27, 2017

(30) Foreign Application Priority Data

Jul. 30, 2014   (CN) .......................... 2014 1 0369438
Jul. 30, 2014   (CN) .......................... 2014 1 0369483
(Continued)

(51) Int. Cl.
*H01M 2/00* (2006.01)
*H01M 2/12* (2006.01)
(Continued)

(52) U.S. Cl.
CPC .............. *H01M 2/127* (2013.01); *A62C 3/07* (2013.01); *A62C 3/16* (2013.01); *A62C 99/0027* (2013.01);
(Continued)

(58) Field of Classification Search
CPC ....................................................... H01M 2/00
See application file for complete search history.

(56) References Cited

U.S. PATENT DOCUMENTS 5,607,787 A * 3/1997 Wedlake ............. H01M 2/1094
429/120
2008/0026283 A1   1/2008 Park et al.
(Continued)

FOREIGN PATENT DOCUMENTS

CN      1142690 A    2/1997
CN    101145623 A    3/2008
(Continued)

*Primary Examiner* — Jacob B Marks
(74) *Attorney, Agent, or Firm* — Volpe and Koenig, P.C.

(57) ABSTRACT

The present invention relates to a lithium-ion battery and an electric vehicle utilizing the lithium-ion battery. The lithium-ion battery comprises a housing, and battery cell group disposed in the housing, wherein, a fire-extinguishing material layer is provided between the battery cell group and the housing, and the housing is provided with drain hole. The technical scheme of the present invention can effectively prevent fire and explosion of lithium-ion battery, and can significantly improve the safety of lithium-ion battery in use.

11 Claims, 3 Drawing Sheets

(30) Foreign Application Priority Data

| Jul. 30, 2014 | (CN) | .......................... 2014 1 0369521 |
|---|---|---|
| Jul. 30, 2014 | (CN) | .......................... 2014 1 0369631 |
| Jul. 30, 2014 | (CN) | .......................... 2014 1 0369664 |
| Jul. 30, 2014 | (CN) | .......................... 2014 1 0369744 |
| Jul. 30, 2014 | (CN) | .......................... 2014 1 0369915 |

(51) Int. Cl.

| B60K 1/04 | (2019.01) |
|---|---|
| H01M 2/02 | (2006.01) |
| H01M 10/42 | (2006.01) |
| A62C 3/07 | (2006.01) |
| A62C 3/16 | (2006.01) |
| A62C 99/00 | (2010.01) |
| A62D 1/06 | (2006.01) |
| H01M 2/10 | (2006.01) |
| H01M 10/0525 | (2010.01) |

(52) U.S. Cl.
CPC ................ *A62D 1/06* (2013.01); *B60K 1/04* (2013.01); *H01M 2/02* (2013.01); *H01M 2/1094* (2013.01); *H01M 2/12* (2013.01); *H01M 2/1276* (2013.01); *H01M 10/0525* (2013.01); *H01M 10/42* (2013.01); *B60Y 2200/91* (2013.01); *H01M 2200/10* (2013.01); *H01M 2200/20* (2013.01); *H01M 2220/20* (2013.01); *Y02E 60/122* (2013.01)

(56) References Cited

U.S. PATENT DOCUMENTS

| 2008/0268332 | A1* | 10/2008 | Potanin | ............... | H01M 2/1061 |
| | | | | | 429/112 |
| 2010/0266881 | A1* | 10/2010 | You | .................... | H01M 2/0277 |
| | | | | | 429/56 |
| 2011/0064997 | A1* | 3/2011 | Peskar | ................ | H01M 2/1022 |
| | | | | | 429/185 |
| 2011/0159341 | A1 | 6/2011 | Iwamoto et al. | | |
| 2012/0244399 | A1* | 9/2012 | Tartaglia | ............ | H01M 2/1022 |
| | | | | | 429/82 |
| 2013/0017422 | A1 | 1/2013 | Bae et al. | | |
| 2013/0240385 | A1 | 9/2013 | Loehrka et al. | | |
| 2014/0377644 | A1* | 12/2014 | Ishikawa | ........... | H01M 10/0569 |
| | | | | | 429/189 |

FOREIGN PATENT DOCUMENTS

| CN | 201191627 | Y | 2/2009 |
|---|---|---|---|
| CN | 102044715 | A | 5/2011 |
| CN | 102064291 | A | 5/2011 |
| CN | 102144317 | A | 8/2011 |
| CN | 203131137 | U | 8/2013 |
| CN | 103579697 | A | 2/2014 |
| CN | 103594663 | A | 2/2014 |
| CN | 103633265 | A | 3/2014 |
| CN | 203644839 | U | 6/2014 |
| CN | 104218193 | A | 12/2014 |
| CN | 104218194 | A | 12/2014 |
| CN | 104218200 | A | 12/2014 |
| CN | 104218201 | A | 12/2014 |
| CN | 104218202 | A | 12/2014 |
| CN | 104218203 | A | 12/2014 |
| CN | 104241565 | A | 12/2014 |
| EP | 2 328 203 | A1 | 6/2011 |
| JP | 405266925 | A | 10/1993 |
| JP | 405275115 | A | 10/1993 |
| JP | 2012252909 | A | 12/2012 |
| WO | 2006/101330 | A1 | 9/2006 |

* cited by examiner

LITHIUM-ION BATTERY AND ELECTRIC VEHICLE UTILIZING THE SAME

CROSS REFERENCE TO RELATED APPLICATIONS

This application is a 35 USC § 371 national stage application of PCT/CN2015/085029, which was filed Jul. 24, 2015, and claims priority to Chinese Patent Application No. 201410369664.5, filed Jul. 30, 2014, Chinese Patent Application No. 201410369744.0, filed Jul. 30, 2014, Chinese Patent Application No. 201410369521.4, filed Jul. 30, 2014, Chinese Patent Application No. 201410369483.2, filed Jul. 30, 2014, Chinese Patent Application No. 201410369631.0, filed Jul. 30, 2014, Chinese Patent Application No. 201410369438.7, filed Jul. 30, 2014, Chinese Patent Application No. 201410369915.X, filed Jul. 30, 2014, all of which are incorporated herein by reference as if fully set forth.

FIELD OF THE INVENTION

The present invention relates to the lithium-ion battery field, in particular to a lithium-ion battery and an electric vehicle utilizing the lithium-ion battery.

BACKGROUND OF THE INVENTION

In view of the crisis of non-renewable energy resources and severe environmental pollution, the development of green, environment friendly, and high-performance lithium-ion batteries has been accelerated in the world, the application domain of lithium-ion batteries has been expanded from the digital product field to secondary power supply in transportation, power, energy storage, aerospace, and communication fields, etc., and the demand for lithium-ion batteries has evolved from the level of hundreds of mAh to the level of hundreds or even thousands of Ah. As the capacity is increased, safety problems are more difficult to control. Hence, presently, the safety of high-capacity lithium-ion batteries is a research subject in many enterprises. The application of lithium-ion batteries will enter into a faster and more extensive development stage if fire and explosion of lithium-ion batteries, which is a worldwide challenge, can be overcome. The Chinese Patent Publication No. CN102044715A has disclosed a lithium-ion battery explosion protection device, which has a structure that comprises a lithium-ion battery housing, a positive electrode, a negative electrode, and a rubber plate, wherein, the lithium-ion battery housing has vent holes, and the rubber plate covers the vent holes and is fixed, and is in 0.5-5 mm thickness. Since a rubber plate is used as an explosion valve, it is unnecessary to arrange any additional liquid injection hole to inject electrolyte and nitrogen into the battery; thus, the liquid injection holes and the explosion valve is integrated into one piece. The device is simple in structure, low in cost, and is easy and simple to manufacture. In use, electrolyte and nitrogen are injected into the battery through the rubber plate with a needle injector. The needle holes will be sealed by the rubber plate owing to the resilience of the rubber plate after the needle is pulled out; thus, the electrolyte and nitrogen will not leak, and the lithium-ion battery can operate normally. That invention is applicable to lithium-ion batteries different in shape and thickness. However, the explosion of lithium-ion battery is mainly resulted from a so-called "thermal runaway" problem owing to insufficient heat dissipation as a result of short circuit, overcharge, or high ambient temperature. "Thermal runaway" causes sharply increased internal pressure in the battery and thereby results in explosion. Therefore, to prevent explosion of lithium-ion battery, not only the internal pressure should be relieved timely, but also comprehensive measures should be taken from the aspect of temperature control so as to effectively attain the purpose of explosion protection for lithium-ion battery. However, the above-mentioned Chinese patent application only focuses on pressure relief by means of vent holes and explosion valve rather than comprehensive protective measures. Hence, the effect is limited.

CONTENTS OF INVENTION

To overcome the defect of fire and explosion of existing lithium-ion batteries resulted from short circuit and insufficient heat dissipation, etc., which can't be eliminated with fire and explosion protection measures in the prior art, the present invention provides a lithium-ion battery with enhanced fire-proof and explosion-proof functions against fire and explosion of lithium-ion batteries, and an electric vehicle that utilizes the lithium-ion battery.

The present invention provides a lithium-ion battery, which comprises a housing, and a battery cell group disposed in the housing, wherein, a fire-extinguishing material layer is provided between the battery cell group and the housing, and the housing is provided with drain hole.

The present invention further provides an electric vehicle, in which the lithium-ion battery provided in the present invention is used as a battery.

In the lithium-ion battery provided in the present invention, a fire-extinguishing material layer is added between the battery cell group and the housing, and the fire-extinguishing material will have a reaction when the temperature of the battery cell group in the lithium-ion battery increases; thus, on one hand, the fire-extinguishing material absorbs heat when it reacts, so that the heat generated in the lithium-ion battery is absorbed, and an effect of inhibiting rapid temperature increase is attained; on the other hand, the oxygen in the battery is displaced gradually by carbon dioxide generated in the reaction of the fire-extinguishing material, so that an element that supports combustion of the battery cores is eliminated, and thereby a purpose of inhibiting combustion is attained; furthermore, the air that exists originally in the housing and the carbon dioxide generated subsequently are vented timely through the drain hole, while the temperature is decreased by means of the heat absorption effect of the fire-extinguishing material, so that the internal pressure in the battery is stabilized at a safe level. Therefore, the technical scheme of the present invention can effectively prevent fire and explosion of lithium-ion battery, and can significantly improve the safety of lithium-ion battery in use.

Other features and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. The accompanying drawings are provided here to facilitate further understanding on the present invention, and constitute a part of this document.

DESCRIPTION OF THE SYMBOLS

1battery cell group; 2battery cell sheath; 3housing; 4pressure relief valve; 5valve body; 6 valve block; 7valve cap; 8through-hole; 9valve cavity; 10resilient component; 11Fire-extinguishing material layer; 12heat-insulating layer.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

Figure 1:
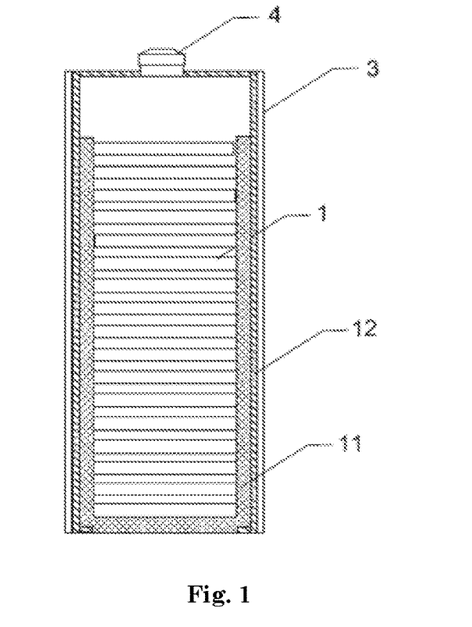
FIG. 1 is a schematic structural diagram of an embodiment of the lithium-ion battery provided in the present invention.
Figure 2:
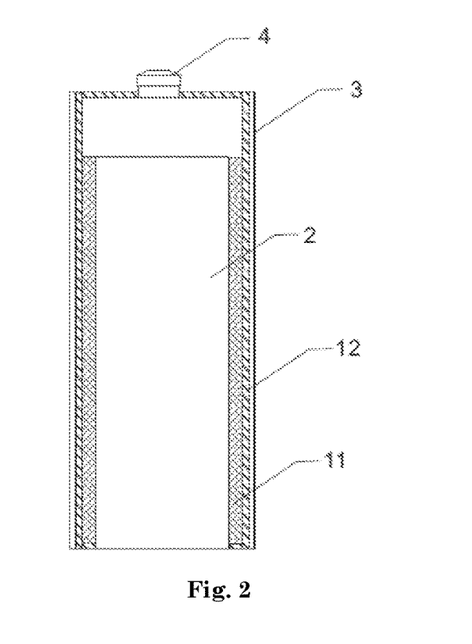
FIG. 2 is a schematic structural diagram of a preferred embodiment of the lithium-ion battery provided in the present invention.

As shown in FIGS. 1 and 2, the lithium-ion battery provided in the present invention comprises a housing 3, and a battery cell group 1 disposed in the housing 3, wherein, a fire-extinguishing material layer 11 is provided between the battery cell group 1 and the housing 3, and the housing 3 is provided with drain hole.

In the lithium-ion battery provided in the present invention, the fire-extinguishing material layer 11 can absorb heat and have a reaction when the temperature of the battery cell group in the lithium-ion battery increases, generate a gas (e.g., carbon dioxide) that can inhibit combustion, and thereby attain a purpose of preventing fire and explosion of the lithium-ion battery. Therefore, the material of the fire-extinguishing material layer 11 may be selected from fire-extinguishing materials that can undergo endothermic reaction and generate carbon dioxide. Preferably, the fire-extinguishing material is selected from bicarbonates. Bicarbonates can undergo a self-decomposition reaction under heat and generate carbon dioxide; in addition, that reaction is a endothermic reaction; hence, bicarbonates meet the operating requirement of the apparatus. A single bicarbonate material may be used as the fire-extinguishing material; thus, material charging and storage in the battery are relatively convenient. More preferably, the bicarbonate is selected from one or more of sodium bicarbonate, potassium bicarbonate, calcium bicarbonate, and ammonium bicarbonate. Preferably, the bicarbonate is used in powder form.

In the lithium-ion battery provided in the present invention, as shown in FIG. 2, the lithium-ion battery may further comprise a battery cell sheath 2 arranged in the housing 3. Preferably, the battery cell group 1 are arranged in the battery cell sheath 2, and the fire-extinguishing material layer 11 is arranged between the battery cell sheath 2 and the housing 3. The material of the battery cell sheath 2 may be ABS plastics or aluminum. ABS plastics has a good flame-retardant property, and can effectively prevent fire propagation even if the battery cell group is burning and thereby inhibit the occurrence of more severity situations. Therefore, ABS plastics is suitable for use to form the battery cell sheath 2. Aluminum has a good heat conduction feature, can conduct out the heat generated in the battery cell group so that the heat is accepted by the fire-extinguishing material; thus, the fire-extinguishing material can absorb enough heat and decomposes; in addition, aluminum is cheaper and has lower density than other materials that have a good heat-conducting property; thus, the components made of aluminum are lighter, beneficial for light weight of the entire battery. Therefore, aluminum is a preferred material for use to form the battery cell sheath 2.

According to a preferred embodiment of the present invention, in the lithium-ion battery provided in the present invention, a shock absorption and flame-retardant material is filled between the battery cell group 1 and the battery cell sheath 2. The shock absorption and flame-retardant material can attenuate external shocks introduced into the battery carrier owing to poor ambient conditions, keep stability of the battery cell group 1, and avoid short circuit resulted from violent vibrations; in addition, the flame-retardant property of the shock absorption and flame-retardant material is helpful for preventing propagation of hazards of the battery cell group 1 during accidental fire. More preferably, the shock absorption and flame-retardant material is selected from silica gel and flame-retardant AN-VDC copolymer fibers. Optimally, the shock absorption and flame-retardant material is silica gel. Silica gel has high fluidity, low viscosity, high insulating property, high waterproof and moisture-proof property, high flame-retardant property, and good physical and mechanical properties, and has high workability. Therefore, silica gel is suitable for use for shock absorption and flame retardancy for the battery cell group in the battery.

According to another preferred embodiment of the present invention, as shown in FIGS. 1 and 2, in the lithium-ion battery, a heat-insulating layer 12 is arranged on the inner surface of the housing 3, i.e., the heat-insulating layer 12 is arranged between the fire-extinguishing material layer 11 and the housing 3. In that case, intrusion of high external heat into the battery can be prevented, and thereby the safety risk of the lithium-ion battery in use can be further decreased. More preferably, the material of the heat-insulating layer 12 is silicon dioxide or asbestos, optimally is silicon dioxide that has high heat-insulating and fire-resisting properties.

According to another preferred embodiment of the present invention, as shown in FIGS. 1-6, the lithium-ion battery further comprises a pressure relief valve 4 matched with the drain hole. In that case, by controlling the open/close of the pressure relief valve 4, excessive pressure in the housing 3 of the lithium-ion battery can be relieved, to keep the internal pressure in the battery at a safe level and decrease the explosion risk. In addition, the pressure relief valve 4 can be used as a vent channel for a small amount of air that entered into the housing 3 when the battery was assembled; thus, the air that exists originally in the housing 3 is displaced by carbon dioxide generated continuously in the housing, so that the battery cell group 1 will not burn since there is no oxygen, and thereby a flame-retardant and fire prevention effect is attained.

Figure 3:
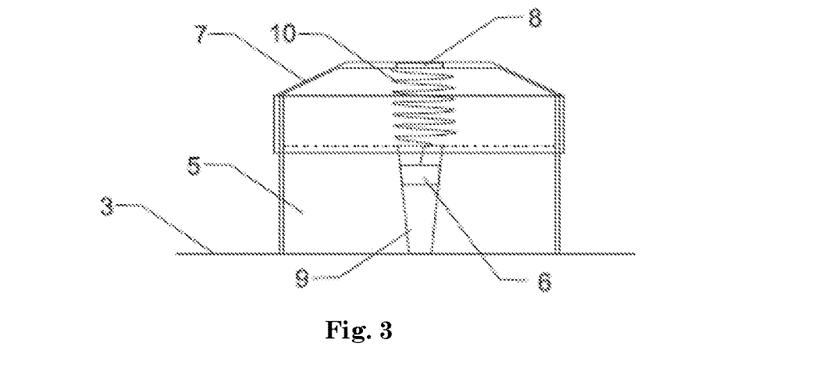
FIG. 3 is a schematic diagram of a preferred structure of the pressure relief valve.

Further preferably, as shown in FIG. 3, the pressure relief valve 4 comprises a valve body 5 and a valve cap 7 with a through-hole 8, which are matched and connected with each other, a valve cavity 9 that communicates with the drain hole on the housing is arranged in the valve body 5, a resilient component 10 is arranged on the bottom surface of the valve cap 7, one end of the resilient component 10 is connected with the valve cap 7, and the other end of the resilient component 10 is connected with a valve block 6 that matches with the valve cavity 9, and the valve block 6 can enter into or exit the valve cavity 9 under the resilient effect of the resilient component 10 to form a sealed state and a vent state. In a specific embodiment, in the pressure relief valve 4, the valve body 5 is connected with the valve cap 7 by threaded connection, a central through-hole 8 is arranged at the center of the valve cap 7, a frustum-shaped valve cavity 9 that has a bigger upper part and a smaller lower part is arranged in the valve body 5, a movable valve block 6 in a frustum shape is fitted and slidably arranged in the valve cavity 9, the taper angle of the movable valve block 6 is essentially the same as the taper angle of the valve cavity 9, a pressure spring 10 (i.e., the resilient component) is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. The pressure spring 10 is in appropriate size, so that the internal pressure of the housing 3 applied on the movable valve block 6 just prevails the spring force of the pressure spring 10 when the internal gas pressure in the housing 3 reaches to certain gas pressure. According to this embodiment, in a natural state, the movable valve block 6 is pressed by the pressure spring 10 in the valve cavity 9 and seals the valve cavity 9. When the internal gas pressure in the housing 3 increases, the movable valve block 6 will be pushed open finally and relieve the sealing of the valve cavity 9 owing to the pressure difference between interior and exterior of the housing 3; thus, excessive pressure in the housing 3 can be relieved, and thereby the internal pressure in the battery can be kept at a safe level, so as to decrease the risk of explosion.

In the lithium-ion battery provided in the present invention, as shown in FIGS. 1-6, preferably the drain hole is arranged in the top of the housing 3. In that case, since the density of the carbon dioxide generated during decomposition of the fire-extinguishing material is higher than the density of air under the same conditions, the carbon dioxide can settle down to the bottom in the housing 3 more easily; thus, the original air is displaced to the top part in the housing. Hence, it is more beneficial to arranged the drain hole in the top of the housing 3 so as to vent the original air quickly and keep the generated carbon dioxide; thus, an oxygen-deficient environment can be formed in the battery, and the flame-retardant and fire prevention purpose can be attained in a better way.

In the lithium-ion battery provided in the present invention, preferably the housing 3 is made of aluminum. Since the density of aluminum is relatively low, the housing made of aluminum is lighter than a housing made of iron or lead alloy, beneficial for light weight of the entire battery.

The present invention further provides an electric vehicle, in which the above-mentioned lithium-ion battery provided in the present invention is used as a battery. For example, the electric vehicle may be an electric bicycle, electric motorcycle, or electric automobile, etc.

Figure 4:
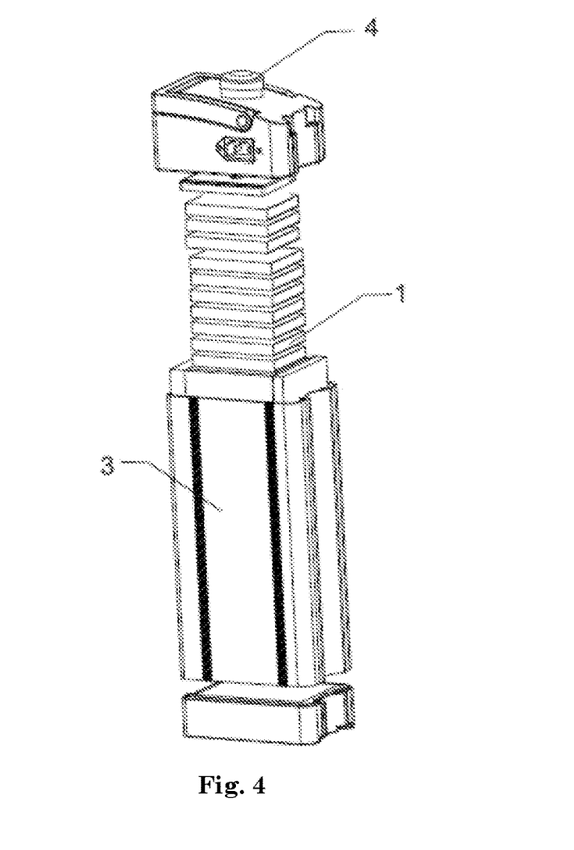
FIG. 4 is a schematic spatial structural diagram of the lithium-ion battery provided in the present invention.
Figure 6:
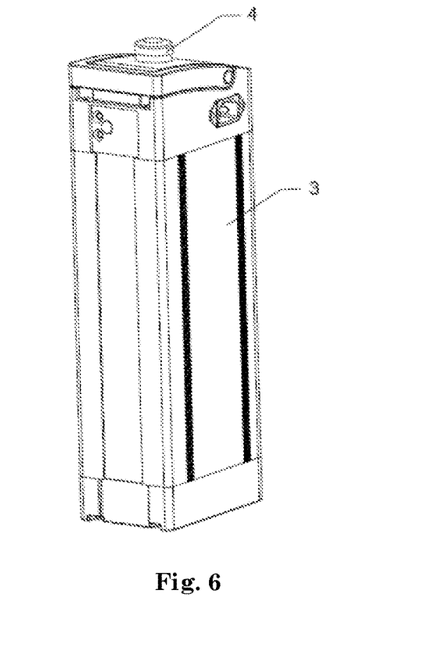
FIG. 6 is a schematic assembly diagram of the lithium-ion battery provided in the present invention.

According to a first embodiment of the present invention, as shown in FIGS. 1, 4 and 6, the lithium-ion battery comprises a housing 3, and a battery cell group 1 disposed in the housing 3, wherein, a fire-extinguishing material that can undergo an endothermic reaction under heat (i.e., the fire-extinguishing material layer 11) is provided in the clearance between the battery cell group 1 and the housing 3, and drain hole is arranged on the housing 3. The fire-extinguishing material preferably is a bicarbonate, more preferably is at least one of sodium bicarbonate, potassium bicarbonate, calcium bicarbonate, and ammonium bicarbonate. Preferably the drain hole is arranged in the top of the housing 3. Preferably a pressure relief valve 4 is matched with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. According to this embodiment, when the lithium-ion battery generates high heat owing to short circuit, etc., the internal temperature and internal gas pressure in the housing 3 will rise accordingly; when the temperature rises to a certain value (e.g., 50° C. when sodium bicarbonate is used as the fire-extinguishing material), the fire-extinguishing material will begin to have a chemical reaction and generate carbon dioxide. The thermal decomposition of the fire-extinguishing material is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. In this embodiment, drain hole may be arranged in the top cap of the housing 3 only, and the pressure relief valve may be omitted. Thus, once the lithium-ion battery generates high heat owing to short circuit, etc. during operation, the material in the battery cell group will undergo a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the fire-extinguishing material begins to have a chemical reaction, decompose, and generate carbon dioxide. The thermal decomposition process is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

Figure 5:
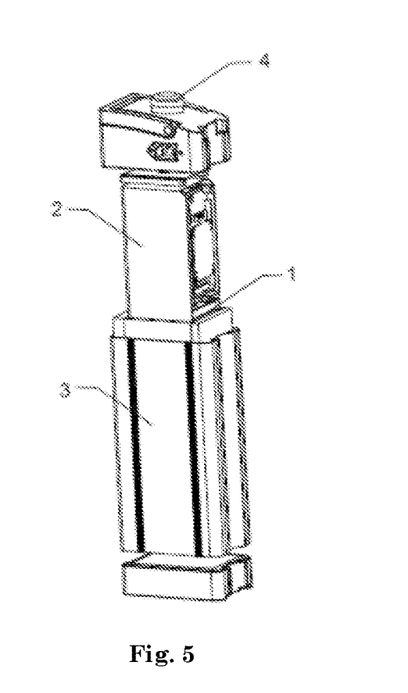
FIG. 5 is another schematic spatial structural diagram of the lithium-ion battery provided in the present invention.

According to a second embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, a fire-extinguishing material that can undergo an endothermic reaction under heat (i.e., the fire-extinguishing material layer 11) is provided in the clearance between the battery cell sheath 2 and the housing 3, and drain hole is arranged on the housing 3. The fire-extinguishing material preferably is a bicarbonate, more preferably is at least one of sodium bicarbonate, potassium bicarbonate, calcium bicarbonate, and ammonium bicarbonate. Preferably the drain hole is arranged in the top of the housing 3. Preferably a pressure relief valve 4 is matched with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. According to this embodiment, when the lithium-ion battery generates high heat owing to short circuit, etc., the temperature in the battery cell sheath 2 will rise gradually, the battery cell sheath 2 will conduct out the heat quickly, and the internal temperature and internal gas pressure in the housing 3 will rise accordingly; when the temperature rises to a certain value (e.g., 50° C. when sodium bicarbonate is used as the fire-extinguishing material), the fire-extinguishing material will begin to undergo a chemical reaction and generate carbon dioxide. The thermal decomposition of the fire-extinguishing material is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. In this embodiment, drain hole may be arranged in the top cap of the housing 3 only, and the pressure relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the fire-extinguishing material begins to have a chemical reaction, decompose, and generate carbon dioxide. The thermal decomposition process of the fire-extinguishing material is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources (e.g., the electrolyte in the battery cell group) spurted through the drain hole have carbon dioxide mixed in them; thus, the hazard of heat source spurting out of the housing is greatly decreased.

According to a third embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, a fire- extinguishing material that can undergo an endothermic reaction under heat (i.e., the fire-extinguishing material layer 11) is provided in the clearance between the battery cell sheath 2 and the housing 3, a shock absorption and flame-retardant material is filled in the clearance between the battery cell sheath 2 and the battery cell group 1, and drain hole is arranged on the housing 3. The fire-extinguishing material preferably is a bicarbonate, more preferably is at least one of sodium bicarbonate, potassium bicarbonate, calcium bicarbonate, and ammonium bicarbonate. Preferably the drain hole is arranged in the top of the housing 3. Preferably a pressure relief valve 4 is provided in fit with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. Preferably, the shock absorption and flame-retardant material is silica gel. According to this embodiment, when the lithium-ion battery generates high heat owing to short circuit, etc., the temperature in the battery cell sheath 2 will rise gradually, and the internal temperature and internal gas pressure in the housing 3 will rise accordingly; when the temperature rises to a certain value (e.g., 50° C. when sodium bicarbonate is used as the fire-extinguishing material), the fire-extinguishing material will begin to undergo a chemical reaction and generate carbon dioxide. The thermal decomposition of the fire-extinguishing material is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. Furthermore, the shock absorption and flame-retardant material can attenuate external shocks introduced into the battery carrier owing to poor ambient conditions, keep stability of the battery cell group, and avoid short circuit resulted from violent vibrations; in addition, the flame-retardant property of the shock absorption and flame-retardant material is helpful for preventing propagation of hazards of the battery cell group during accidental fire. In this embodiment, drain hole may be arranged in the top cap of the housing 3 only, and the pressure relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the fire-extinguishing material begins to have a chemical reaction, decompose, and generate carbon dioxide. The thermal decomposition process is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

According to a fourth embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, a heat-insulating layer 12 is provided between the housing 3 and the battery cell sheath 2, a fire-extinguishing material (i.e., the fire-extinguishing material layer 11) is provided in the clearance between the battery cell sheath 2 and the heat-insulating layer 12, and drain hole is arranged on the housing 3. The fire-extinguishing material preferably is a bicarbonate, more preferably is at least one of sodium bicarbonate, potassium bicarbonate, calcium bicarbonate, and ammonium bicarbonate. Preferably the drain hole is arranged in the top of the housing 3. Preferably a pressure relief valve 4 is provided in fit with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. Preferably, the material of the heat-insulating layer 12 is silicon dioxide. According to this embodiment, when the lithium-ion battery generates high heat owing to short circuit, etc., the temperature in the battery cell sheath 2 will rise gradually, and the heat is difficult to dissipate owing to the blockage action of the heat-insulating layer 12; thus, the internal temperature and internal gas pressure in the housing 3 will rise accordingly; when the temperature rises to a certain value (e.g., 50° C. when sodium bicarbonate is used as the fire-extinguishing material), the fire-extinguishing material will begin to undergo a chemical reaction and generate carbon dioxide. The thermal decomposition of the fire-extinguishing material is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. In this embodiment, drain hole may be arranged in the top cap of the housing 3 only, and the pressure relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the fire-extinguishing material begins to have a chemical reaction, decompose, and generate carbon dioxide. The thermal decomposition process is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

According to a fifth embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, a fire-extinguishing material that can undergo an endothermic reaction under heat (i.e., the fire-extinguishing material layer 11) is provided in the clearance between the battery cell sheath 2 and the housing 3, a heat-insulating layer 12 is provided between the inner surface of the housing 3 and the fire-extinguishing material layer 11, a shock absorption and flame-retardant material is filled in the clearance between the battery cell sheath 2 and the battery cell group 1, and drain hole is arranged on the housing 3. The fire-extinguishing material preferably is a bicarbonate, more preferably is at least one of sodium bicarbonate, potassium bicarbonate, calcium bicarbonate, and ammonium bicarbonate. Preferably the drain hole is arranged in the top of the housing 3. Preferably a pressure relief valve 4 is provided in fit with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. Preferably, the shock absorption and flame-retardant material is silica gel. Preferably, the material of the heat-insulating layer 12 is silicon dioxide. According to this embodiment, when the lithium-ion battery generates high heat owing to short circuit, etc., the temperature in the battery cell sheath 2 will rise gradually, and the heat is difficult to dissipate owing to the blockage action of the heat-insulating layer; thus, the internal temperature and internal gas pressure in the housing 3 will rise accordingly; when the temperature rises to a certain value (e.g., 50° C. when sodium bicarbonate is used as the fire-extinguishing material), the fire-extinguishing material will begin to have a chemical reaction and generate carbon dioxide. The thermal decomposition of the fire-extinguishing material is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. Furthermore, the shock absorption and flame-retardant material can attenuate external shocks introduced into the battery carrier owing to poor ambient conditions, keep stability of the battery cell group, and avoid short circuit resulted from violent vibrations; in addition, the flame-retardant property of the shock absorption and flame-retardant material is helpful for preventing propagation of hazards of the battery cell group during accidental fire. In this embodiment, drain hole may be arranged in the top cap of the housing 3 only, and the pressure relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the fire-extinguishing material begins to have a chemical reaction, decompose, and generate carbon dioxide. The thermal decomposition process is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

According to a sixth embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, bicarbonate powder (as the fire-extinguishing material layer 11) is filled in the clearance between the battery cell sheath 2 and the housing 3, silica gel (as the shock absorption and flame-retardant material) is filled in the clearance between the battery cell sheath 2 and the battery cell group 1, and drain hole is arranged on the housing 3. Preferably the drain hole is arranged in the top of the housing 3. Preferably a pressure relief valve 4 is matched with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. According to this embodiment, when the lithium-ion battery generates high heat owing to short circuit, etc., the temperature in the battery cell sheath 2 will rise gradually, and the internal temperature and internal gas pressure in the housing 3 will rise accordingly; when the temperature rises to 50° C., sodium bicarbonate will begin to have a chemical reaction and decompose into sodium carbonate, water, and carbon dioxide. The thermal decomposition of sodium carbonate is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. Furthermore, the silica gel that serves as the shock absorption and flame-retardant material can attenuate external shocks introduced into the battery carrier owing to poor ambient conditions, keep stability of the battery cell group, and avoid short circuit resulted from violent vibrations; in addition, the flame-retardant property of the silica gel that serves as the shock absorption and flame-retardant material is helpful for preventing propagation of hazards of the battery cell group during accidental fire. In this embodiment, drain hole may be arranged in the top cap of the housing 3 only, and the pressure relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the sodium bicarbonate begins to have a chemical reaction and decompose into sodium carbonate, water, and generate carbon dioxide. The thermal decomposition process of sodium bicarbonate is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

According to a seventh embodiment of the present invention, as shown in FIGS. 2, 5 and 6, the lithium-ion battery comprises a battery cell group 1, a battery cell sheath 2, and a housing 3, wherein, the battery cell group 1 is arranged in the battery cell sheath 2, the battery cell sheath 2 is disposed in the housing 3, bicarbonate powder (as the fire-extinguishing material layer 11) is provided in the clearance between the battery cell sheath 2 and the housing 3, silicon dioxide (as the heat insulating layer 12) is provided between the inner surface of the housing 3 and the bicarbonate powder, and drain hole is arranged on the housing 3. Preferably the drain hole is arranged in the top of the housing 3. Preferably a pressure relief valve 4 is matched with the drain hole; further preferably, as shown in FIG. 3, the pressure relief valve 4 comprises a valve body 5 and a movable valve block 6, a valve cap 7 is connected to the valve body 5 by threaded connection, a central through-hole 8 is arranged at the center of the valve cap 7, a valve cavity 9 that has a bigger upper part and a smaller lower part is arranged in the valve body 5, the movable valve block 6 is also in a frustum shape and is fitted and slidably arranged in the valve cavity 9, a pressure spring 10 is arranged between the valve cap 7 and the movable valve block 6, one end of the pressure spring 10 is hooked on the movable valve block 6, the other end of the pressure spring 10 abuts against the bottom surface of the valve cap 7, and the outer diameter of the turns of the pressure spring 10 is greater than the diameter of the central through-hole 8. Preferably the battery cell sheath 2 is made of ABS plastics or aluminum. According to this embodiment, when the lithium-ion battery generates high heat owing to short circuit, etc., the temperature in the battery cell sheath 2 will rise gradually, the heat is difficult to dissipate owing to the blockage action of the heat-insulating layer, and the internal temperature and internal gas pressure in the housing 3 will rise accordingly; when the temperature rises to 50° C., sodium bicarbonate will begin to have a chemical reaction and decompose into sodium carbonate, water, and carbon dioxide. The thermal decomposition of sodium carbonate is a heat-absorbing process, and the heat is consumed continuously in the thermal decomposition process; thus, rapid temperature rise in the housing 3 can be inhibited. As the generate carbon dioxide is mixed with the original air in the housing 3, the gas pressure in the housing 3 will further increase; when the gas pressure in the housing 3 reaches to two times of atmospheric pressure, the movable valve block 6 will be pushed by the gas pressure in the housing 3 and overcome the spring force of the pressure spring 10 and rise up from the original position in fit with the valve cavity 9; thus, a clearance is formed between the movable valve block 6 and the walls of the valve cavity 9, and the gas pressure in the housing 3 is relieved via the clearance, till the gas pressure in the housing 3 drops to a value below two times of atmospheric pressure. As carbon dioxide is generated continuously, the small amount of air existing originally in the housing 3 is displaced and vented gradually; thus, the oxygen inside the housing 3 is finally vented off, and the clearance in the housing 3 is completely occupied by carbon dioxide finally. Since there is no oxygen anymore, an essential element for burning of the battery cell group is lost in the housing 3; thus, a flame-retardant and fire prevention purpose is attained, and the occurrence of more severe safety accidents can be avoided. In this embodiment, drain hole may be arranged in the top cap of the housing 3 only, and the relief valve may be omitted. Thus, once the lithium-ion battery generates high heat owing to short circuit, etc. during operation, the temperature in the battery cell sheath 2 will rise gradually; when the temperature in the battery cell sheath 2 rises to a certain level, the material in the battery cell group will have a reaction, resulting in increased internal pressure in the battery cell group; consequently, the battery cell group are ruptured, the heat sources (gas and particles) generated in the battery cell group will be spurted out of the housing through the drain hole under the action of the internal pressure, and thereby the heat sources in the housing are reduced; meanwhile, as the internal temperature in the housing 3 rises, the sodium bicarbonate begins to have a chemical reaction and decompose into sodium carbonate, water, and generate carbon dioxide. The thermal decomposition process of sodium bicarbonate is a heat-absorbing process, and the heat is consumed continuously in the thermal decomposition process; thus, rapid internal temperature rise in the housing 3 can be inhibited; as the generated carbon dioxide is mixed with the original air in the housing 3, the gas pressure in the housing 3 further increases, and oxygen is vented out of the housing 3 via the drain hole, so that the interior of the housing 3 is isolated from the oxygen in the external environment. Since carbon dioxide is generated continuously and the original air in the housing 3 is vented gradually, the oxygen in the housing 3 is vented off finally, and the clearance in the housing 3 is occupied completely by carbon dioxide finally. Since there is no oxygen anymore, an essential element for burning of the battery cell group is lost in the housing 3, and thereby a flame-retardant and fire prevention purpose is attained, and more severe safety accidents can be avoided. Furthermore, since carbon dioxide is generated, the heat sources spurted through the drain hole have carbon dioxide mixed in them; thus, the hazard of heat source spurting out of the housing is greatly decreased.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A lithium-ion battery comprising a housing, a battery cell group disposed in the housing, and a fire-extinguishing material layer between the battery cell group and the housing, the housing comprising a drain hole, the lithium-ion battery further comprising a battery sheath arranged in the housing, the battery cell group arranged in the battery cell sheath, the fire-extinguishing material layer arranged between the battery cell sheath and the housing, and the material of the battery cell sheath is ABS plastics or aluminum;
wherein a heat-insulating layer is arranged on the inner surface of the housing, and the material of the heat-insulating layer is silicon dioxide or asbestos.

2. The lithium-ion battery according to claim 1, wherein the material of the fire-extinguishing material layer is a fire-extinguishing material that can undergo an endothermic reaction and generate carbon dioxide.

3. The lithium-ion battery according to claim 1, wherein a shock absorption and flame-retardant material is filled between the battery cell group and the battery cell sheath.

4. The lithium-ion battery according to claim 1, further comprising a pressure relief valve matched with the drain hole.

5. The lithium-ion battery according to claim 4, wherein the pressure relief valve comprises a valve body and a valve cap with a through-hole, which are matched and connected with each other, a valve cavity that communicates with the drain hole is arranged in the valve body, a resilient component is arranged on the bottom surface of the valve cap, one end of the resilient component is connected with the valve cap, and the other end of the resilient component is connected with a valve block that matches with the valve cavity, and the valve block can enter into or exit the valve cavity under the resilient effect of the resilient component to form a sealed state and a vent state.

6. The lithium-ion battery according to claim 1, wherein the drain hole is arranged in the top of the housing.

7. The lithium-ion battery according to claim 1, wherein the material of the housing is aluminum.

8. An electric vehicle in which the lithium-ion battery according to claim 1 is used as a battery.

9. The lithium-ion battery according to claim 2, wherein the material of the fire-extinguishing material layer is a bicarbonate.

10. The lithium-ion battery according to claim 3, wherein the material of the fire-extinguishing material layer is one or more of sodium bicarbonate, potassium bicarbonate, calcium bicarbonate, and ammonium bicarbonate.

11. The lithium-ion battery according to claim 3, wherein the shock absorption and flame-retardant material is silica gel or flame-retardant AN-VDC copolymer fibers.

* * * * *